US012770327B2

(12) United States Patent
Lee et al.

(10) Patent No.: US 12,770,327 B2
(45) Date of Patent: Oct. 20, 2026

(54) 3D MAP PROVIDING SYSTEM

(71) Applicant: KNU-Industry Cooperation Foundation, Gangwon-do (KR)

(72) Inventors: Chang Wook Lee, Gangwon-do (KR); Bo Kyun Ko, Gangwon-do (KR); Sung Jae Park, Gangwon-do (KR); Han Bit Hwang, Gangwon-do (KR)

(73) Assignee: KNU-Industry Cooperation Foundation, Gangwon-do (KR)

( * ) Notice: Subject to any disclaimer, the term of this patent is extended or adjusted under 35 U.S.C. 154(b) by 193 days.

(21) Appl. No.: 18/757,808

(22) Filed: Jun. 28, 2024

(65) Prior Publication Data

US 2025/0308159 A1 Oct. 2, 2025

(30) Foreign Application Priority Data

Apr. 2, 2024 (KR) ........................ 10-2024-0044476

(51) Int. Cl.
*G06T 17/05* (2011.01)
*G06Q 50/26* (2024.01)

(52) U.S. Cl.
CPC ........... *G06T 17/05* (2013.01); *G06Q 50/265* (2013.01)

(58) Field of Classification Search
CPC ......... G06T 17/05; G06T 11/10; G06T 19/20; G06Q 50/265; G01C 21/3804; G01C 21/367; G01C 21/3682; G09B 29/006; G09B 29/12
See application file for complete search history.

(56) References Cited

U.S. PATENT DOCUMENTS

2013/0073400 A1* 3/2013 Heath ...................... G06F 16/29 715/738
2013/0321401 A1* 12/2013 Piemonte ............ G06F 16/2291 345/419
2023/0360519 A1* 11/2023 Sudhir ............... G01C 21/3697
2023/0419657 A1* 12/2023 Drosdeck ................ G06T 17/05

FOREIGN PATENT DOCUMENTS

JP S4897627 A 12/1973
JP H10187029 A 7/1998
JP H10288943 A 10/1998
JP 2011150386 A 8/2011
JP 2013205072 A 10/2013
(Continued)

OTHER PUBLICATIONS

The First Office Action in the corresponding Japanese patent application No. 2024-107416 dated Jul. 4, 2025.
(Continued)

*Primary Examiner* — Daniel F Hajnik
*Assistant Examiner* — Sarah Yeo Lee
(74) *Attorney, Agent, or Firm* — Harness, Dickey & Pierce, P.L.C.

(57) ABSTRACT

The present disclosure relates to a 3D map providing system, and includes a user terminal that communicates through a wireless communication network, and a server that provides a 3D map to the user terminal through a dedicated application and generates the 3D map by combining spatial information and location information for each area. According to the present disclosure, there is an effect of improving readability and visibility by providing a 3D map.

4 Claims, 9 Drawing Sheets

(56) References Cited

FOREIGN PATENT DOCUMENTS

| | | | |
|---|---|---|---|
| JP | 2013205901 | A | 10/2013 |
| JP | 2019-128370 | A | 8/2019 |
| JP | 2019-149742 | A | 9/2019 |
| KR | 10-0937051 | B1 | 1/2010 |
| KR | 10-1004350 | B1 | 12/2010 |
| KR | 10-20150111467 | A | 10/2015 |

OTHER PUBLICATIONS

The Second Office Action in the corresponding Japanese patent application No. 2024-107416 dated Dec. 2, 2025.
Office Action in the corresponding Korean patent application No. 10-2024-0044476 dated Jul. 7, 2025.
Extended European Search Report from correspond EP Application No. 24185737, dated Dec. 13, 2024.

* cited by examiner

| TYPES OF RISK INFORMATION | EXAMPLE |
| --- | --- |
| GEOGRAPHIC RISK INFORMATION | CLIFFS, ROCKFALLS, PONDS, BEACHES, RIVERSIDES |
| SEASONAL (TIME) RISK INFORMATION | FLOOD SEASON, AVALANCHE SEASON |
| WARNING INFORMATION | RAINFALL, SNOWFALL, RAPID WATER, PRESENCE OF DANGEROUS PEOPLE, PRESENCE OF DANGEROUS ANIMALS, DISCHARGE OF DANGEROUS SUBSTANCES, PESTS, DISEASES SUCH AS FOOT-AND-MOUTH DISEASE, ETC. |
| WEATHER RISK INFORMATION | VOLCANOES, EARTHQUAKES, TSUNAMIS, HEAT WAVES, HEAVY SNOW, HEAVY RAIN, EXTREME COLD |
| TRAFFIC RISK INFORMATION | CONGESTION, CLOSURE, DETOUR |

FIG. 4

3D MAP PROVIDING SYSTEM

CROSS-REFERENCE TO RELATED APPLICATION

This application claims priority to Korean Patent Application No. 10-2024-0044476 filed on Apr. 2, 2024 and all the benefits accruing therefrom under 35 U.S.C. § 119, the contents of which are incorporated by reference in their entirety.

BACKGROUND

The present disclosure relates to a technology for providing a 3D map.

As the tourist population increases, the content available to tourists is also increasing. Tourist maps illustrating conventional tourist information content, such as locations of tourist attractions, restaurants, accommodations, etc. are commonly provided, but since these tourist maps provide only show brief information, there may be some limitations for tourists to reach their destination using only the maps.

The tourist maps serve a very important function of condensing everything about tourism and allowing the tourists to experience the culture at a glance. and deliver information on tourist destinations, transportation, history, and culture all at once, and thus there is a constant need to improve the tourist maps. When classifying the types of tourism maps that have been mainly used so far, they can be largely classified into a general map application type, a mixed transportation/tourism type, and a 3D picture map type.

The general map application type has an advantage of being easy to produce because it follows the notation format of a general map and is obtained by mainly editing information about tourist destinations into a simple form, but has a disadvantage of being less aesthetically pleasing and having a weak role in delivering images or promoting tourism. The mixed transportation/tourism type can increase an aesthetic effect of delivering the tourist destinations because it is produced in a form obtained by displaying roads and areas based on the national base map and inserting illustrations and photos, but it still has visual complexity because it uses the road system of the national base map as is. The 3D picture map type has difficulty in accurately providing location information or geographic information because it is produced in a 3D form using perspective drawing, but the 3D picture map type offers an advantage of illustrating the characteristics of tourist destinations in three dimensions. These types of conventional tourist map types are produced in a form obtained by only adding visual effects to tourist destinations based on the road system of the national base map, and the surrounding mountains are written in the same pattern using contour lines or along the north-and-south direction, and accordingly, the conventional tourist map types are inconvenient in use because they are different from those visually recognized while actually driving through the tourist destinations within tourist destinations at county-level local governments.

Existing maps serve a very important function of compressing all information and making it accessible at a glance, but limitations in delivering images or providing spatial information are still considered problems. In particular, Korea's topography, which has many mountainous areas, has clear limitations of information that can be provided through flat maps, and thus visibility and information delivery capability through 3D maps are required.

CITATION LIST

Patent Literature

PTL 1: Korean Patent Registered No. 10-0937051

SUMMARY

The present disclosure provides a 3D map in which spatial information and location information are combined.

Matters disclosed in the present disclosure is not limited to the matters mentioned above, and other matters not mentioned will be clearly understood by those skilled in the art from the description below.

In accordance with an exemplary embodiment, there is provided a 3D map providing system including a user terminal configured to communicate through a wireless communication network, and a server configured to provide a 3D map to the user terminal through a dedicated application and generate the 3D map by combining spatial information and location information for each area.

The server may be configured to differentiate colors depending on a geological structure when generating the 3D map.

The server may be configured to differentiate colors depending on an altitude when generating the 3D map.

The server may be configured to display related information including a public institution, a school, a tourist destination, a port, an airport, and a walking course on the 3D map.

BRIEF DESCRIPTION OF THE DRAWINGS

Exemplary embodiments can be understood in more detail from the following description taken in conjunction with the accompanying drawings, in which:

FIG. 4 is a table illustrating types of risk information in accordance with the exemplary embodiment;

DETAILED DESCRIPTION

Figure 1:
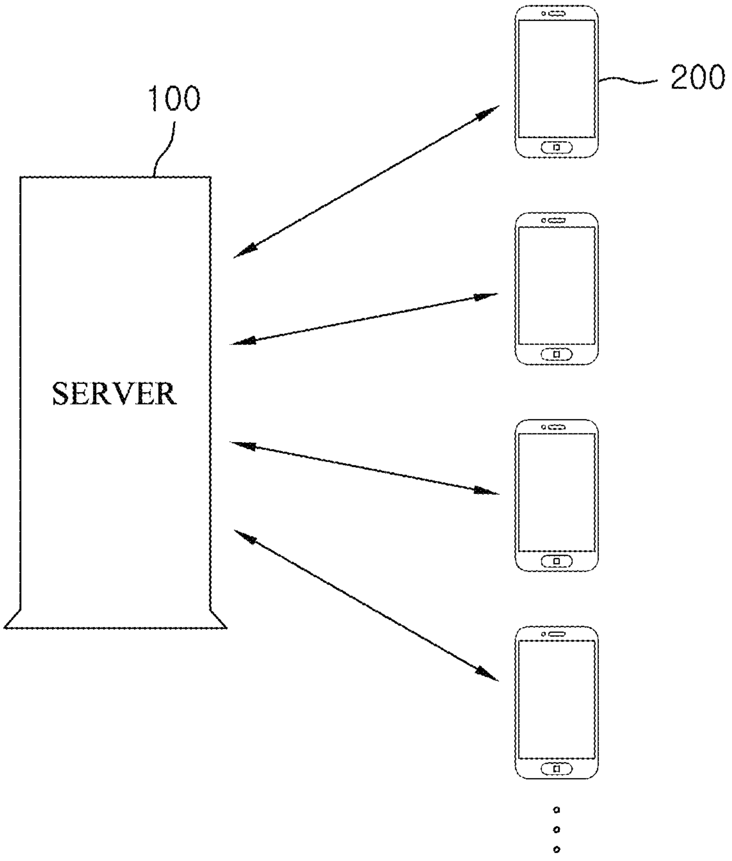
FIG. 1 is a diagram schematically illustrating a configuration of a 3D map providing system in accordance with an exemplary embodiment.

Since the present disclosure may be subject to various changes and has various embodiments, specific embodiments will be illustrated in the drawings and described in detail. However, this is not intended to limit the present disclosure to specific embodiments, and should be understood to include all changes, equivalents, and substitutes included in the spirit and technical scope of the present disclosure.

The terms used in this application are only used to describe specific embodiments and are not intended to limit the present disclosure. Singular expressions include plural expressions, unless the context clearly indicates otherwise. It is to be understood that, in this specification, terms such as “comprise” or “have” are intended to designate the presence of described features, numbers, steps, operations, components, parts, or combinations thereof, but do not preclude the presence or addition of one or more other features, numbers, steps, operations, components, parts, or combinations thereof.

Unless otherwise defined, all terms used herein, including technical or scientific terms, have the same meaning as commonly understood by a person of ordinary skill in the relevant technical field. Terms that are defined in commonly used dictionaries are should be interpreted as having a meaning consistent with the meaning in the context of the related technology, and should not be interpreted in an idealized or overly formal sense unless clearly defined in this specification.

In addition, in describing the present disclosure with reference to the accompanying drawings, identical components will be assigned the same reference numerals regardless of the reference numerals, and duplicate descriptions thereof will be omitted. In describing the present disclosure, if it is determined that a detailed description of related known technologies may unnecessarily obscure the gist of the present disclosure, the detailed description thereof will be omitted.

FIG. 1 is a diagram schematically illustrating a configuration of a 3D map providing system according to an embodiment of the present disclosure.

Referring to FIG. 1, the 3D map providing system according to the embodiment of the present disclosure includes a server 100 and a user terminal 200.

The user terminal 200 is a terminal capable of communicating through a wireless communication network, and may be implemented with various devices such as mobile phones, cell phones, smartphones, and tablet PCs.

The user terminal 200 may download and install a dedicated application from the server.

The server 100 communicates with the user terminal 200 through a wireless communication network and provides a 3D map to the user terminal 200 through the dedicated application, and generates and provides the 3D map by combining spatial information and location information for each area.

The server 100 may display the map in different colors depending on a geological structure when generating the 3D map.

The server 100 may display the map in different colors depending on an altitude when generating the 3D map.

The server 100 may display related information including public institutions, schools, tourist attractions, ports, airports, and walking courses on the 3D map.

The 3D map providing system may provide a group management function to user terminals that have registered for a group with a predetermined group name through the dedicated application.

Figure 2:
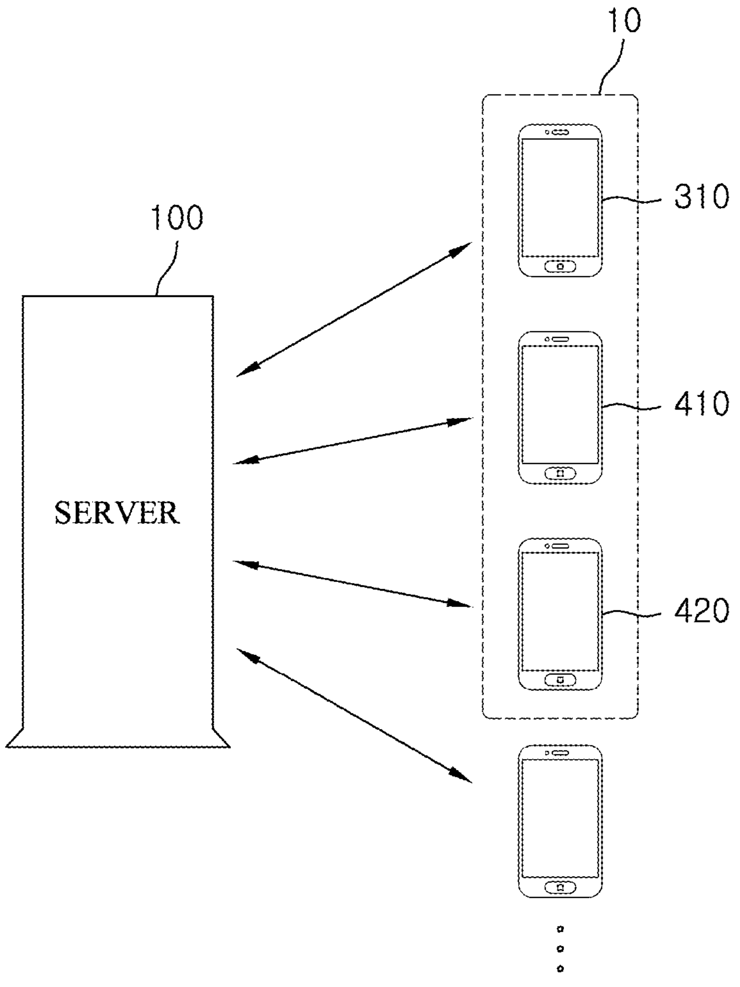
FIG. 2 is a diagram schematically illustrating a configuration of a 3D map providing system in accordance with another exemplary embodiment.

FIG. 2 schematically illustrates a configuration of a 3D map providing system according to another embodiment of the present disclosure. FIG. 2 illustrates providing the group management function by the 3D map providing system according to the embodiment of the present disclosure.

Referring to FIG. 2, the server 100 may provide a group management function to user terminals 310, 410, and 420 that have registered for a group 10 through the dedicated application. In this case, when registering for the group, one or more user terminals may be registered as an administrator terminal 310, and the remaining user terminals may be registered as group member terminals 410 and 420. The server 100 may provide a group management function including different functions to the administrator terminal 310 and the group member terminals 410 and 420 through the dedicated application, respectively.

Figure 3:
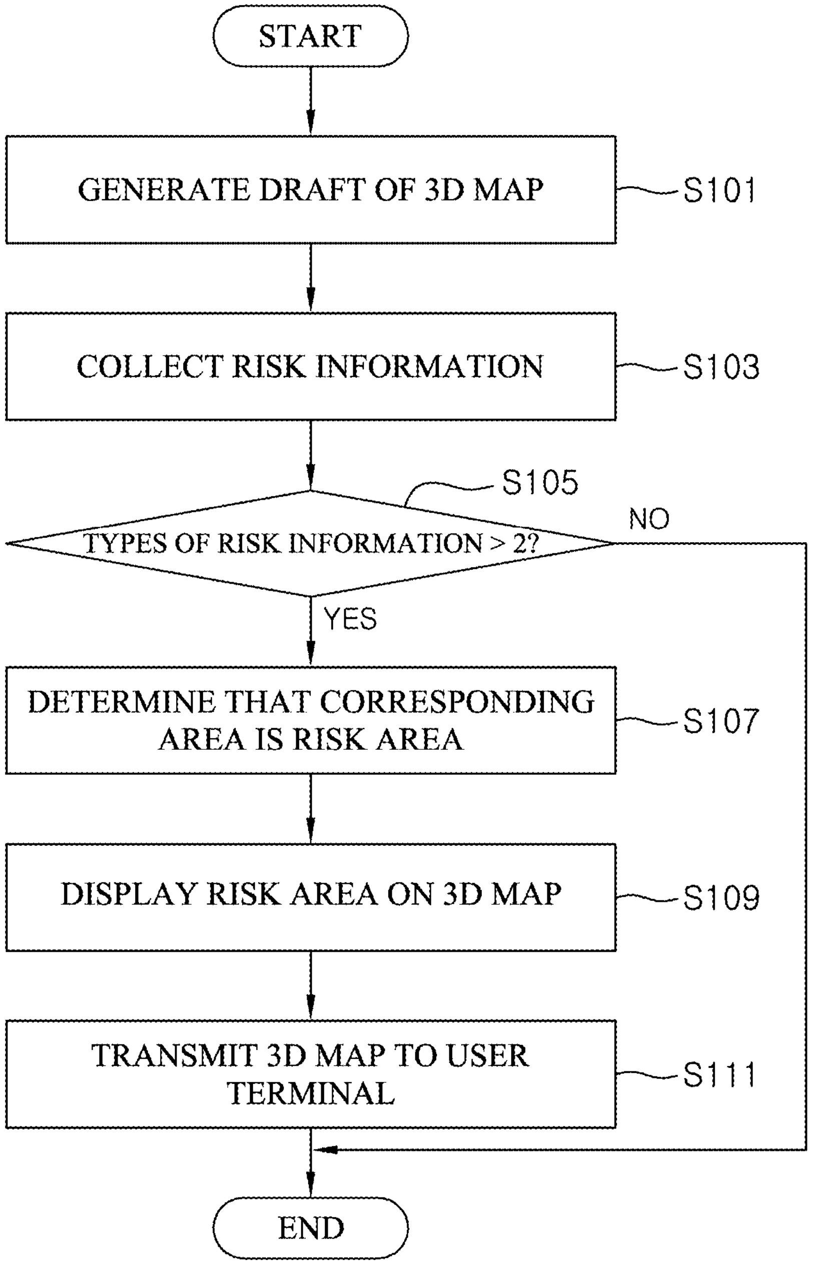
FIG. 3 is a flowchart illustrating a risk area determination process in the 3D map providing system in accordance with an exemplary embodiment.

FIG. 3 is a flowchart illustrating a risk area determination process in the 3D map providing system according to an embodiment of the present disclosure, and FIG. 4 is a table illustrating types of risk information according to an embodiment of the present disclosure.

Referring to FIGS. 3 and 4, the server 100 generates a draft of 3D map (S101) and collects two or more types of risk information (S103). In one embodiment of the present disclosure, the server 100 may collect risk information such as geographic risk information, seasonal (time) risk information, warning information, weather risk information, and traffic risk information. In this case, the server 100 may collect the risk information through a server of a related public institution or information providing institution. For example, the weather risk information may be collected through a server of the Korea Meteorological Administration, and the traffic risk information may be collected through a server of the National Police Agency.

In FIG. 4, cliffs, rockfalls, ponds, beaches, riversides are exemplified as geographic risk information, flood season and avalanche season are exemplified as seasonal risk information, rainfall, snowfall, rapid water, presence of dangerous people, presence of dangerous animals, discharge of dangerous substances, pests, diseases such as foot-and-mouth disease, etc. are exemplified as warning information, volcanoes, earthquakes, tsunamis, heat waves, heavy snow, heavy rain, and extreme cold are exemplified as weather risk information, and congestion, closure, and detour are exemplified as traffic risk information.

If there are two or more types of risk information collected (S105), the server 100 determines that the corresponding area is a risk area (S107). For example, if there is cliff information and rainfall information for the corresponding area, the area is determined to be a risk area.

In addition, the server 100 completes the 3D map by displaying the risk area on the draft 3D map (S109). Then, the server 100 transmit the 3D map to the user terminal 200 (S111).

Figure 5:
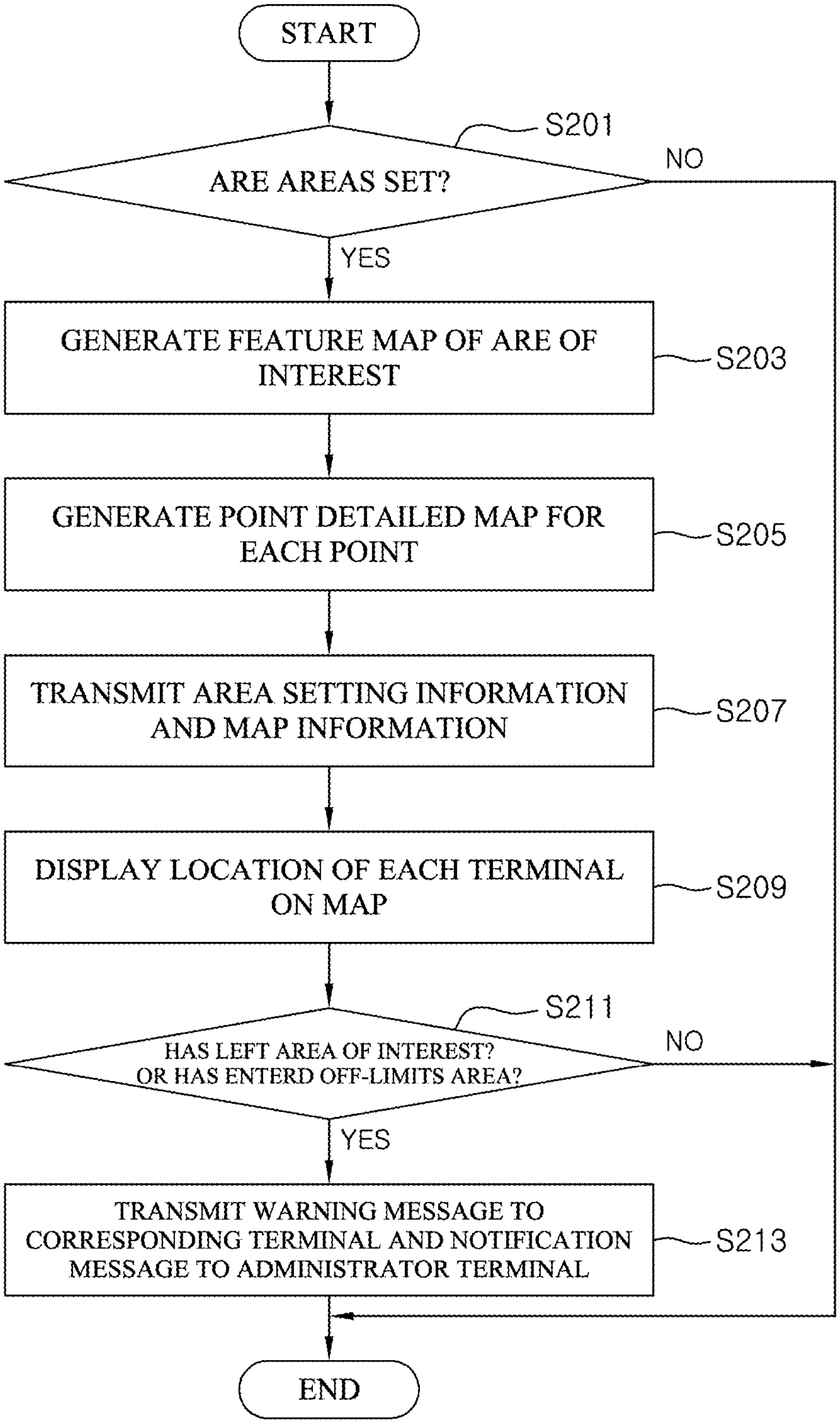
FIG. 5 is a flowchart illustrating a specific method for a group management function in a 3D map providing system in accordance with the exemplary embodiment.

FIG. 5 is a flowchart illustrating a specific method for the group management function in the 3D map providing system according to an embodiment of the present disclosure.

Referring to FIG. 5, the server 100 provides the administrator terminal 310 with a function capable of setting an area of interest and an off-limits area on a 3D map through a dedicated application. In this case, the server 100 may provide the function of inputting a line by freely drawing a line on a 3D map when setting the area of interest and the off-limits area, and may set a closed curve input from the administrator terminal 310 as the area of interest and the off-limits area through the input function. In one embodiment of the present disclosure, the server 100 may limit the off-limits area to be set within the area of interest.

When the area of interest and the off-limits area are set by the administrator terminal 310 (S201), the server 100 generates a feature map that briefly displaying the area of interest 610 focusing on key points thereof (S203).

Then, the server 100 generates a point detailed map, which is a map displaying detailed information about each point in the feature map (S205).

Then, the server 100 transmits the area of interest and off-limits area information, and the feature map and detailed point information to the manager terminal 310 and the group member terminals 410 and 420 (S207).

Then, the server 100 provides terminals 310, 410, and 420 with a 3D map on which areas of interest and off-limits areas are displayed, and displays the current location of each of the terminals 310, 410, and 420 on the map (S209).

The server 100 checks the location of each of the terminal 310, 410, and 420 in real time, and when each of the terminals 310, 410, and 420 has left the area of interest or enters the off-limits area (S211), the server 100 transmits a warning message to the corresponding terminal and a notification message to the administrator terminal 310 (S213).

Figure 6:
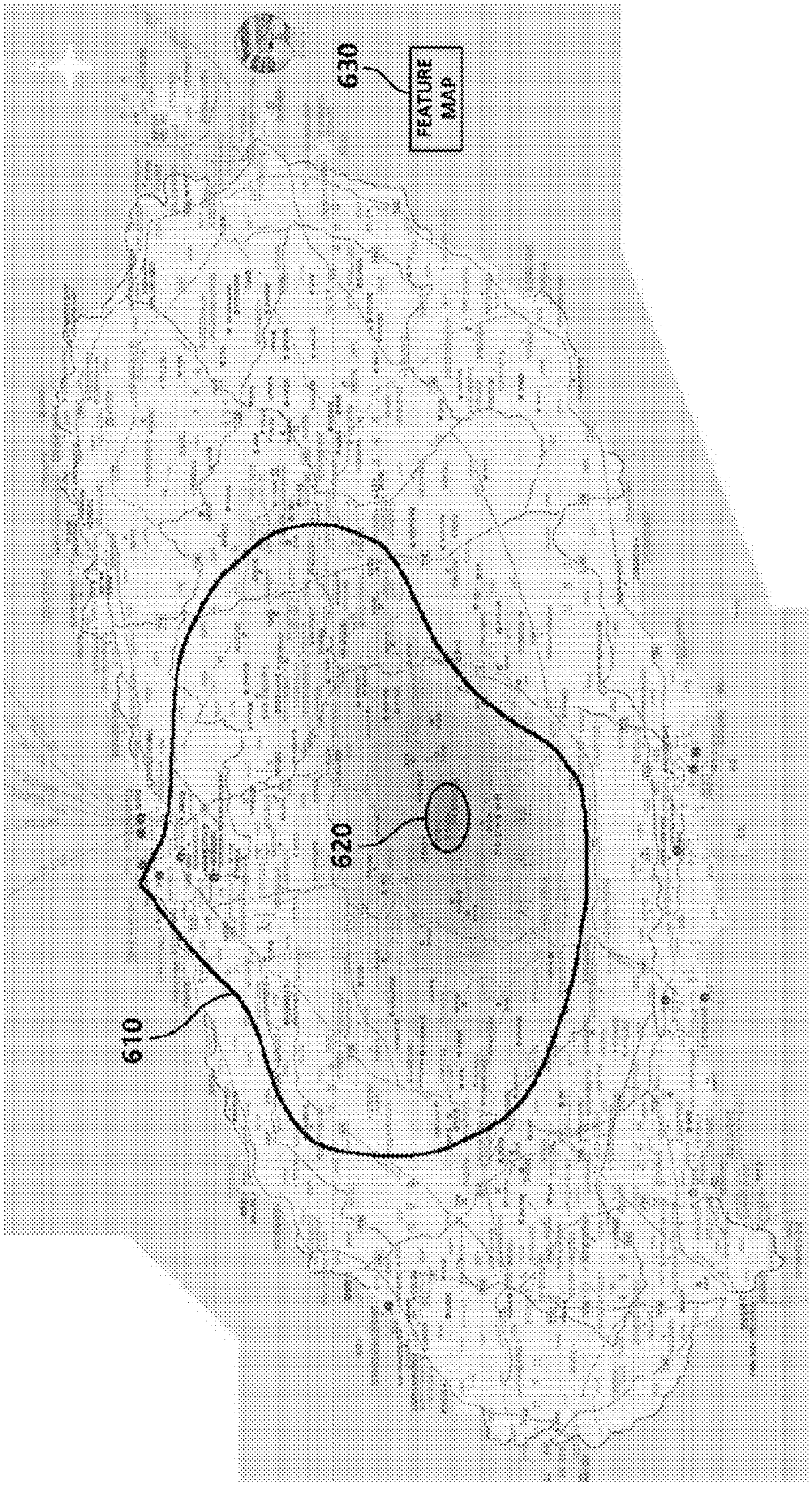
FIG. 6 is an example diagram for describing area setting in a 3D map providing system in accordance with the exemplary embodiment.

FIG. 6 is an example diagram for describing area setting in the 3D map providing system according to an embodiment of the present disclosure.

FIG. 6 is an example of a 3D map of Jeju Island displayed on a terminal, and it can be seen that an area of interest 610 and an off-limits area 620 are set on the map. Here, the off-limits area 620 is set mainly around Baeknokdam of Hallasan Mountain.

By inputting a closed curve on a 3D map in the dedicated application through an input unit provided in the administrator terminal 310, the area of interest 610 and the off-limits area 620 may be set. In this case, if the input unit is a separate touch pad, a closed curve may be input on the touch pad using a stylus pen, etc., and if the input unit is a touch screen, the closed curve may be input using a finger, etc. For example, if there are areas within an accessible area of interest that need to be off-limits, such as a lake, the off-limits area 620 may be set inside the area of interest 610.

In FIG. 6, the server provides a 'feature map' icon 630 on part of a screen, and when the feature map icon 630 is selected, the server provides a feature map briefly displaying the area of interest 610 focusing on the key points thereof.

Figure 7:
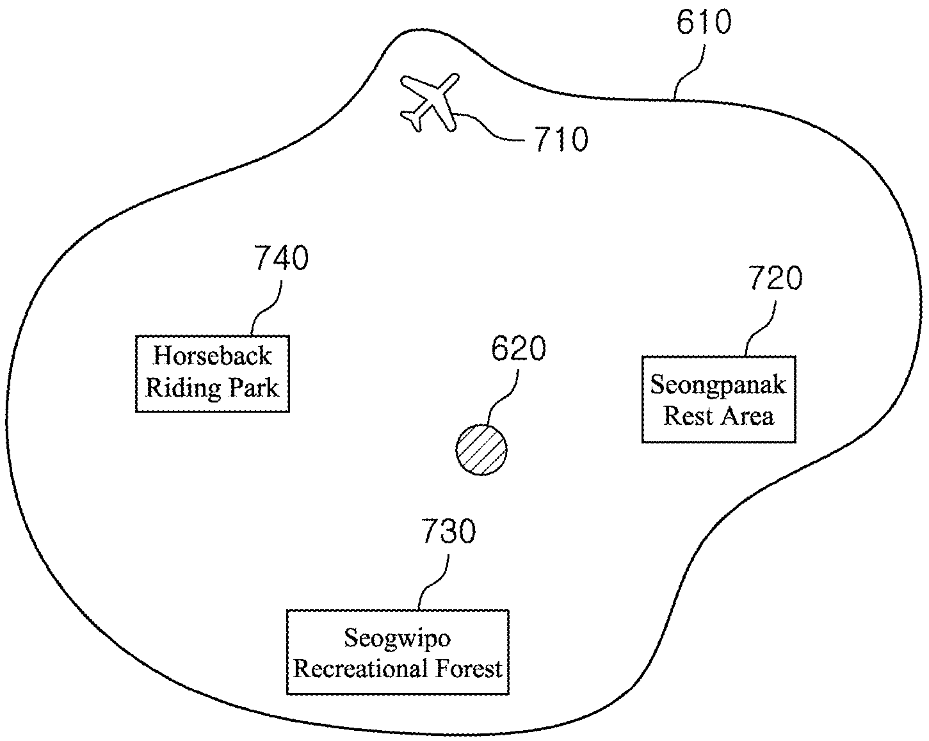
FIG. 7 illustrates a feature map in a 3D map providing system in accordance with the exemplary embodiment.

FIG. 7 illustrates a feature map in a 3D map providing system according to an embodiment of the present disclosure.

The feature map of FIG. 7 is an example of the feature map for the area of interest 610 illustrated in FIG. 6. In the feature map of FIG. 7, Jeju Airport 710, Seongpanak Rest Area 720, Seogwipo Recreational Forest 730, and Horseback Riding Park 740 are displayed as simple icons or blocks as examples of key points. When a key point is selected from the feature map, the server 100 provides a point detailed map, which is a map in which detailed information about the selected key point is displayed.

Figure 8:
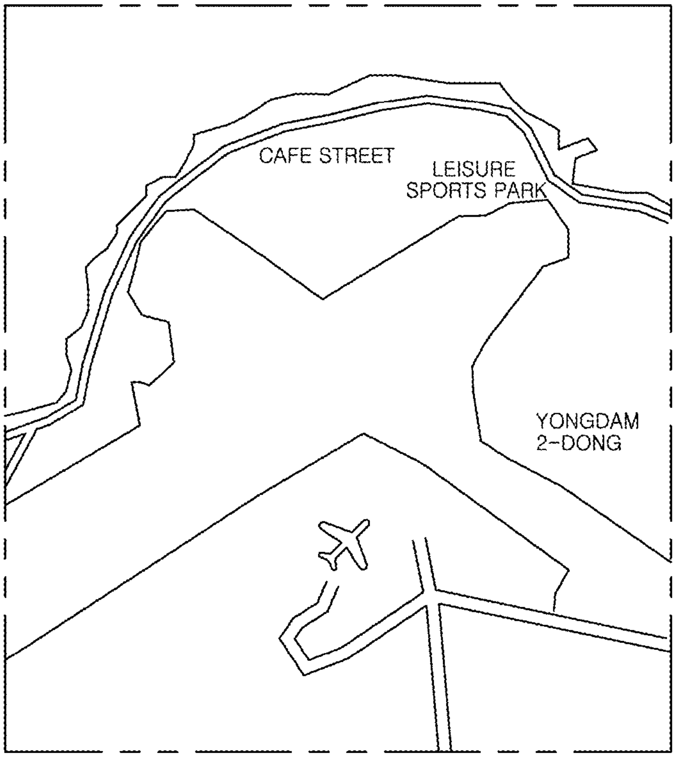
FIG. 8 illustrates a point detailed view in a 3D map providing system in accordance with the exemplary embodiment.

FIG. 8 illustrates the point detailed map in the 3D map providing system according to an embodiment of the present disclosure. The point detailed map illustrated in FIG. 8 is an example of the point detailed map for Jeju Airport 710 in FIG. 7. As such, the present disclosure provides an interface that allows a user to quickly and easily move to a specific area on a 3D map screen through a feature map with key points and a point detailed map with detailed information about key points.

Figure 9:
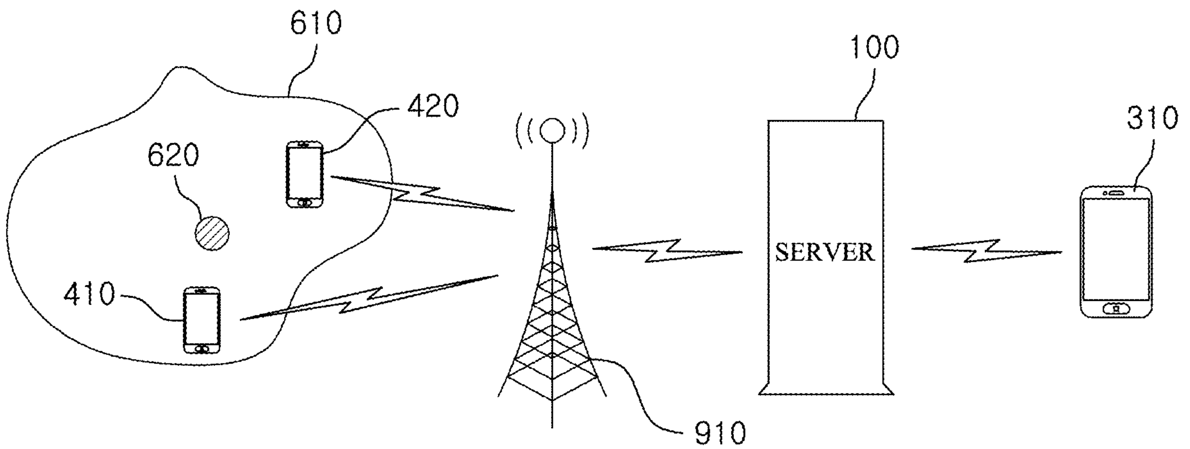
FIG. 9 is an example diagram for describing a process of checking a location of a terminal and determining whether it has left an area in a 3D map providing system in accordance with the exemplary embodiment.

FIG. 9 is an example diagram for describing a process of checking a location of a terminal and determining whether it has left an area in the 3D map providing system according to an embodiment of the present disclosure.

Referring to FIG. 9, group member terminals 410 and 420 may transmit location information to the server 100 through a base station 910 linked with the server 100. In addition, the server 100 may receive location information determined by the group member terminals 410 and 420 from the base station 910 and determine whether or not the group member terminals 410 and 420 have left the area of interest 610 or entered the off-limits area 620.

The group member terminals 410 and 420 may determine their location using at least one of the GPS positioning method, WIFI positioning method, and CELL positioning method. In this case, the positioning method can be adaptively changed depending on an external environment where the terminal is located, and the location can be determined through the changed method.

In addition, the server 100 may transmit a determination result related to the area of interest 610 determined based on the location information of the group member terminals 410 and 420 to the administrator terminal 310. Specifically, the server 100 may determine whether or not the group member terminals 410 and 420 exist in the area of interest 610 which is set based on the location information of the group member terminals 410 and 420.

The server 100 may transmit to the administrator terminal 310 whether or not the group member terminal has left the area of interest 610 or entered the off-limits area 620 according to the determination result of whether the group member terminals 410 and 420 exist in the area of interest 610.

The server 100 may determine whether the group member terminals 410 and 420 exist in the area of interest 610. In other words, the server 100 may determine that the group member terminals 410 and 420 are located within the area of interest 610, based on the location information. In addition, the server 100 may transmit a result indicating that they are located within the area of interest 610 to the administrator terminal 310.

The server 100 may determine whether the group member terminals 410 and 420 have left the area of interest 610. In other words, the group member terminals 410 and 420 may move their locations and be located outside o) the area of interest 610. The server 100 may receive location information again at the point where the group member terminals 410 and 420 have moved their locations. In addition, the server 100 may determine that the group member terminals 410 and 420 have left the area of interest 610 based on the location information of the group member terminals 410 and 420 received again, and transmit the determination result to the administrator terminal 310.

Thereafter, the administrator terminal 310 may trigger a sensor of the group member terminals 410 and 420 or send a call or message depending on whether or not the group member terminal 410 and 420 has left the area of interest 610 to quickly respond to the situation where the group member terminals 410 and 420 have left the area of interest 610.

In addition, the server 100 may log the location where the group member terminals 410 and 420 has left and may later use the information to reset a safe area based on the logged location.

The server 100 may determine whether the group member terminals 410 and 420 have entered the off-limits area 620. In other words, the server 100 may determine that the group member terminals 410 and 420 have entered the off-limits area 620 based on the received location information, and transmit the determination result to the administrator terminal 310.

Consequently, the server 100 may provide information that allows the administrator to quickly recognize a sudden situation of the group member by determining whether or not the group member terminals 410 and 420 exist within the area set by the terminal based on the location information determined from the group member terminals 410 and 420.

In this case, the group member terminals 410 and 420 and the administrator terminal 310 may have completed an authentication process to receive location information of the group member terminals 410 and 420 based on a communication service. In other words, the group member terminals 410 and 420 may perform administrator registration for the administrator terminal 310 to manage the locations of the group member terminals 410 and 420. In addition, the administrator terminal 310 may be linked with the group member terminals 410 and 420 by performing the administrator authentication on the group member terminals 410 and 420 for which administrator registration has been completed. Thereafter, the administrator terminal 310 may receive location information determined from the group member terminals 410 and 420.

The group member terminals 410 and 420 may perform the administrator registration for the administrator terminal 310 that wishes to check the location of the group member terminals 410 and 420. Here, the administrator registration may mean registration for the administrator terminal 310 that can receive the location information from the group member terminals 410 and 420. That is, the administrator registration may mean an application for granting a use authority to a function capable of managing the group member terminals 410 and 420 to the administrator terminal 310.

Thereafter, the administrator terminal 310 may use a dedicated application that can manage the functions of group member terminals 410 and 420 to perform the administrator authentication for the group member terminals 410 and 420 for which administrator registration has been completed. Here, the administrator authentication may mean acceptance of the administrator registration performed by the group member terminals 410 and 420. That is, the administrator authentication may mean accepting administrator registration requested from the group member terminals 410 and 420 in order to manage functions such as calls, texts, location check, schedule check, and activity level related to group member terminals 410 and 420, and preferences of the group member terminals 410 and 420.

Specifically, the administrator terminal 310 may accept consent to use the terms and conditions of management for the group member terminals 410 and 420 using a dedicated application and then perform the administrator authentication based on unique identification information assigned to the administrator terminal 310. Here, the administrator terminal 310 may perform administrator authentication in response to the identification information of the administrator terminal 310 for which administrator registration has been performed from the group member terminals 410 and 420.

In other words, the server 100 may issue an authentication number in response to the identification information of the administrator terminal 310 for which administrator registration has been performed from the group member terminals 410 and 420. In addition, the administrator terminal 310 may complete the administrator authentication using an authentication number issued in response to the identification information. In this case, the administrator terminal 310 may perform administrator authentication only once. For example, after executing a dedicated application, the administrator terminal 310 may accept consent to the terms and conditions of use for the dedicated application and the terms and conditions of management for personal location information. Thereafter, the administrator terminal 310 may receive an authentication number issued from the server 100 in response to a phone number as unique identification information, and may log in to the dedicated application using the received authentication number. If the authentication number is not issued, the administrator terminal 310 may request the server 100 to retransmit the authentication number. In addition, the administrator terminal 310 may connect to the group member terminals 410 and 420 by logging in to the dedicated application.

The group member terminals 410 and 420 and the administrator terminal 310 perform operations of linking terminals in order to receive location information of the group member terminal 410 and 420, so that the administrator terminal 310 manages functions related to the operation of the group member terminals 410 and 420, and the group member terminals 410 and 420 may perform operations according to functions managed through the administrator terminal 310.

Although the present invention has been described above using several preferred embodiments, these embodiments are illustrative and not limiting. Those of ordinary skill in the technical field to which the present invention pertains will understand that various changes and modifications may be made thereto without departing from the spirit of the present invention and the scope of rights set forth in the appended claims.

According to the present disclosure, there is an effect of improving readability and visibility by providing a 3D map.

In addition, according to the present disclosure, there is an effect of improving understanding of an area and greatly contributing to the convenience of travelers.

Although the 3D map providing has been described with reference to the specific embodiments, it is not limited thereto. Therefore, it will be readily understood by those skilled in the art that various modifications and changes can be made thereto without departing from the spirit and scope of the present invention defined by the appended claims.

REFERENCE SIGNS LIST

100: server
200: user terminal
310: administer terminal
410, 420: group member terminal
910: base station

What is claimed is:

1. A 3D map providing system comprising:

an administrator terminal configured to communicate through a wireless communication network;

at least one group member terminal configured to communicate through the wireless communication network; and a server configured to:

provide, through a dedicated application, a 3D map to the administrator terminal and the at least one group member terminal, the 3D map being generated by combining spatial information and location information for each area;

provide, to the administrator terminal through the dedicated application, an input function configured to receive a line freely drawn on the 3D map;

set, based on a first closed-curve input received from the administrator terminal through the input function, an area of interest on the 3D map, and set, based on a second closed-curve input received from the administrator terminal through the input function, an off-limits area within the area of interest;

provide, to the administrator terminal and the at least one group member terminal through the dedicated application, the 3D map displaying the area of interest and the off-limits area;

receive location information of the at least one group member terminal and determine in real time whether the at least one group member terminal has left the area of interest or entered the off-limits area;

in response to the at least one group member terminal leaving the area of interest or entering the off-limits area, transmit a warning message to the corresponding group member terminal and transmit a notification message to the administrator terminal;

provide a feature-map icon on the 3D map;

in response to selection of the feature-map icon, provide, through the dedicated application, a feature map displaying the area of interest with one or more user-selectable key points; and in response to selection of one of the key points from the feature map, provide, through the dedicated application, a point detailed map displaying detailed information about the selected key point.

2. The 3D map providing system of claim 1, wherein the server is configured to differentiate colors depending on a geological structure when generating the 3D map.

3. The 3D map providing system of claim 1, wherein the server is configured to differentiate colors depending on an altitude when generating the 3D map.

4. The 3D map providing system of claim 1, wherein the server is configured to display related information including a public institution, a school, a tourist destination, a port, an airport, and a walking course on the 3D map.

* * * * *